US012750910B2

(12) United States Patent
Shete et al.

(10) Patent No.: US 12,750,910 B2
(45) Date of Patent: Sep. 29, 2026

(54) O-CLOUD NODE SHUTDOWN SCENARIOS FOR ENERGY SAVING

(71) Applicant: RAKUTEN MOBILE, INC., Tokyo (JP)

(72) Inventors: Pankaj Shete, Tokyo (JP); Awn Muhammad, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 563 days.

(21) Appl. No.: 18/021,924

(22) PCT Filed: Jan. 20, 2023

(86) PCT No.: PCT/US2023/011237
§ 371 (c)(1),
(2) Date: Feb. 17, 2023

(87) PCT Pub. No.: WO2024/054242
PCT Pub. Date: Mar. 14, 2024

(65) Prior Publication Data

US 2024/0276580 A1 Aug. 15, 2024

Related U.S. Application Data

(60) Provisional application No. 63/405,477, filed on Sep. 11, 2022.

(51) Int. Cl.

| | |
|---|---|
| ***H04W 76/20*** | (2018.01) |
| ***H04W 24/04*** | (2009.01) |
| ***H04W 24/08*** | (2009.01) |

(52) U.S. Cl.
CPC ........... *H04W 76/20* (2018.02); *H04W 24/04* (2013.01); *H04W 24/08* (2013.01)

(58) Field of Classification Search
CPC ..... H04W 76/20; H04W 24/04; H04W 24/08; H04W 52/0206; H04W 52/0235; H04W 52/028; H04W 76/34; H04W 24/02
See application file for complete search history.

(56) References Cited

U.S. PATENT DOCUMENTS

2010/0162244 A1* 6/2010 Tsai ........................ G06F 9/505
718/100
2012/0064908 A1 3/2012 Fox et al.
(Continued)

FOREIGN PATENT DOCUMENTS

CN 102651918 B 9/2015
JP 5125659 B2 1/2013
(Continued)

OTHER PUBLICATIONS

International Search Report issued May 3, 2023 in International Application No. PCT/US23/11237.
(Continued)

*Primary Examiner* — Steven Hieu D Nguyen
(74) *Attorney, Agent, or Firm* — Sughrue Mion, PLLC

(57) ABSTRACT

A method of power and traffic management in an open radio access network (O-RAN) network may include obtaining at least one parameter indicating traffic performance of a first O-RAN Cloud (O-Cloud) node, determining whether the at least one parameter satisfies a predetermined shutdown condition for the first O-Cloud node, and based on determining that the at least one parameter satisfies the predetermined shutdown condition, deactivating the first O-Cloud node.

20 Claims, 15 Drawing Sheets

(56) References Cited

U.S. PATENT DOCUMENTS

| | | | | |
|---|---|---|---|---|
| 2014/0052864 | A1 | 2/2014 | Van Der Linden et al. | |
| 2017/0039120 | A1* | 2/2017 | Ganesan | G06F 11/3055 |
| 2021/0258866 | A1* | 8/2021 | Chou | H04W 24/02 |
| 2022/0038289 | A1 | 2/2022 | Huang | |
| 2022/0116799 | A1 | 4/2022 | Wang et al. | |
| 2022/0151001 | A1 | 5/2022 | Vivanco et al. | |
| 2022/0166874 | A1* | 5/2022 | Antemijczuk | H04M 3/244 |
| 2022/0407664 | A1* | 12/2022 | Wang | H04L 5/0098 |
| 2023/0054483 | A1* | 2/2023 | Lee | H04W 76/19 |
| 2023/0188233 | A1* | 6/2023 | Gupta Hyde | H04B 17/3913<br>370/329 |
| 2023/0413111 | A1* | 12/2023 | Kotaru | H04W 28/0858 |
| 2025/0298665 | A1* | 9/2025 | Li | H04L 41/0833 |

FOREIGN PATENT DOCUMENTS

| | | | |
|---|---|---|---|
| JP | 2016-509397 | A | 3/2016 |
| JP | 6421470 | B2 | 11/2018 |
| TW | 201830939 | A | 8/2018 |
| WO | 2023/204850 | A1 | 10/2023 |

OTHER PUBLICATIONS

Written Opinion issued May 3, 2023 in International Application No. PCT/US23/11237.

"O-Ran Working Group 6 (Cloudification and Orchestration Workgroup) Study on O-Cloud Energy Savings", O-RAN.WG6.O-Cloud Energy Savings.v01.00, Technical Report, 2022, pp. 1-29.

Translation of communication dated Jan. 6, 2026 in Japanese Application No. 2025-500197.

* cited by examiner

O-CLOUD NODE SHUTDOWN SCENARIOS FOR ENERGY SAVING

CROSS REFERENCE TO RELATED APPLICATIONS

This application is a National Stage of International Application No. PCT/US2023/011237 filed Jan. 20, 2023, claiming priority based on U.S. Provisional Application No. 63/405,477 filed Sep. 11, 2022.

BACKGROUND

1. Field

Apparatuses and methods consistent with example embodiments of the present disclosure relate to power and traffic management in an open radio access network (O-RAN).

2. Description of Related Art

A radio access network (RAN) is an important component in a telecommunications system, as it connects end-user devices (or user equipment) to other parts of the network. The RAN includes a combination of various network elements (NEs) that connect the end-user devices to a core network. Traditionally, hardware and/or software of a particular RAN is vendor specific.

Open RAN (O-RAN) technology has emerged to enable multiple vendors to provide hardware and/or software to a telecommunications system. To this end, O-RAN disaggregates the RAN functions into a centralized unit (CU), a distributed unit (DU), and a radio unit (RU). The CU is a logical node for hosting Radio Resource Control (RRC), Service Data Adaptation Protocol (SDAP), and/or Packet Data Convergence Protocol (PDCP) sublayers of the RAN. The DU is a logical node hosting Radio Link Control (RLC), Media Access Control (MAC), and Physical (PHY) sublayers of the RAN. The RU is a physical node that converts radio signals from antennas to digital signals that can be transmitted over the FrontHaul to a DU. Because these entities have open protocols and interfaces between them, they can be developed by different vendors.

FIG. 1 is a diagram of a related art O-RAN architecture, FIG. 2 is a diagram of a related art Service Management and Orchestration (SMO) framework with a non-real-time (NRT) RAN Intelligent Controller (RIC) architecture in a functional view, and FIG. 3 is a diagram of a related art SMO framework with an NRT RIC in a services view. Referring to FIGS. 1 through 3, RAN functions in the O-RAN architecture are controlled and optimized by a RIC. The RIC is a software-defined component that implements modular applications to facilitate the multivendor operability required in the O-RAN system, as well as to automate and optimize RAN operations. The RIC is divided into two types: an NRT RIC and a near-real-time RIC (nRT RIC).

The NRT RIC is the control point of a non-real-time control loop and operates on a timescale greater than 1 second within the SMO framework. Its functionalities are implemented through modular applications called rApps (rApp 1, . . . , rApp N in FIGS. 1-3), and include: providing policy based guidance and enrichment across the A1 interface, which is the interface that enables communication between the NRT RIC and the nRT RIC; performing data analytics; Artificial Intelligence/Machine Learning (AI/ML) training and inference for RAN optimization; and/or recommending configuration management actions over the O1 interface, which is the interface that connects the SMO to RAN managed elements (e.g., nRT RIC, O-RAN Centralized Unit (O-CU), O-RAN Distributed Unit (O-DU), etc.).

The nRT RIC operates on a timescale between 10 milliseconds and 1 second and connects to the O-DU, O-CU (disaggregated into the O-CU control plane (O-CU-CP) and the O-CU user plane (O-CU-UP)), and an open evolved NodeB (O-eNB) via the E2 interface. The nRT RIC uses the E2 interface to control the underlying RAN elements (E2 nodes/network functions (NFs)) over a near-real-time control loop. The nRT RIC monitors, suspends/stops, overrides, and controls the E2 nodes (O-CU, O-DU, and O-eNB) via policies. For example, the nRT sets policy parameters on activated functions of the E2 nodes. Further, the nRT RIC hosts xApps to implement functions such as quality of service (QOS) optimization, mobility optimization, slicing optimization, interference mitigation, load balancing, security, etc. The two types of RICs work together to optimize the O-RAN. For example, the NRT RIC provides, over the A1 interface, the policies, data, and artificial intelligence (AI)/machine learning (ML) models enforced and used by the nRT RIC for RAN optimization, and the nRT returns policy feedback (i.e., how the policy set by the NRT RIC works).

The SMO framework, within which the NRT RIC is located, manages and orchestrates RAN elements. Specifically, the SMO manages and orchestrates what is referred to as the O-RAN Cloud (O-Cloud). The O-Cloud is a collection of physical RAN nodes that host the RICs, O-CUs, and O-DUs, the supporting software components (e.g., the operating systems and runtime environments), and the SMO itself. In other words, the SMO manages the O-Cloud from within. The O2 interface is the interface between the SMO and the O-Cloud it resides in. Through the O2 interface, the SMO provides infrastructure management services (IMS) and deployment management services (DMS).

In the related art, O-Cloud nodes may operate at high power modes, even though the amount of traffic occurring on the node does not warrant such power consumption, resulting in unnecessary and inefficient power consumption and traffic distribution.

SUMMARY

According to embodiments, systems and methods are provided for power and traffic management in an open radio access network (O-RAN).

According to an aspect of the disclosure, a method of power and traffic management in an O-RAN network may include obtaining at least one parameter indicating traffic performance of a first O-RAN Cloud (O-Cloud) node, determining whether the at least one parameter satisfies a predetermined shutdown condition for the first O-Cloud node, and based on determining that the at least one parameter satisfies the predetermined shutdown condition, deactivating the first O-Cloud node.

According to an aspect of the disclosure, a system for power and traffic management in an O-RAN network may include at least one memory storing instructions and at least one processor configured to execute the instructions to obtain at least one parameter indicating traffic performance of a first O-Cloud node, determine whether the at least one parameter satisfies a predetermined shutdown condition for the first O-Cloud node, and based on determining that the at least one parameter satisfies the predetermined shutdown condition, deactivate the first O-Cloud node.

According to an aspect of the disclosure, a non-transitory computer-readable storage medium may store instructions that, when executed by at least one processor, cause the at least one processor to obtain at least one parameter indicating traffic performance of a first O-Cloud node, determine whether the at least one parameter satisfies a predetermined shutdown condition for the first O-Cloud node, and based on determining that the at least one parameter satisfies the predetermined shutdown condition, deactivate the first O-Cloud node.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
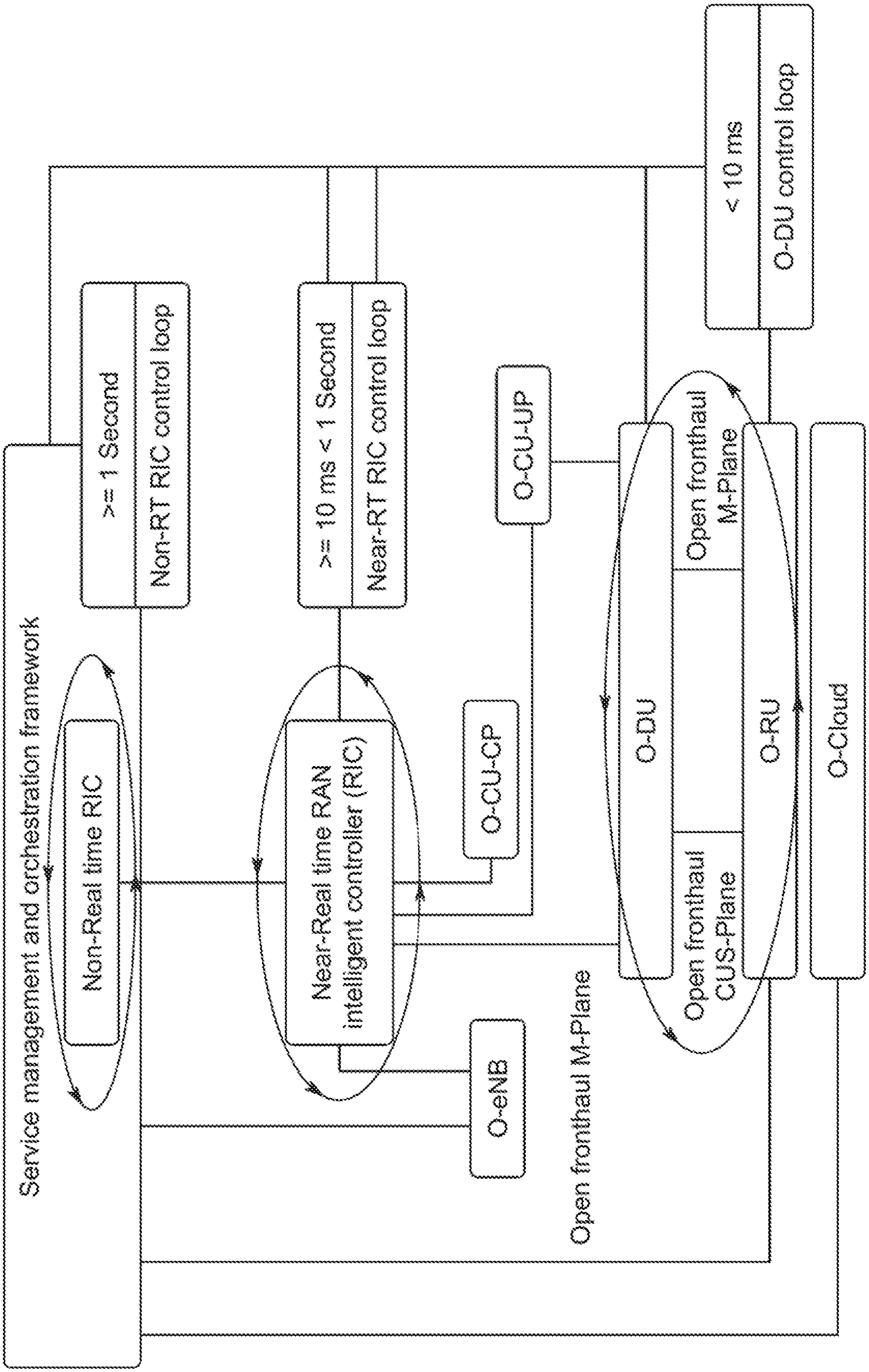
FIG. 1 is a diagram of an open radio access network (O-RAN) architecture according to related art.
Figure 2:
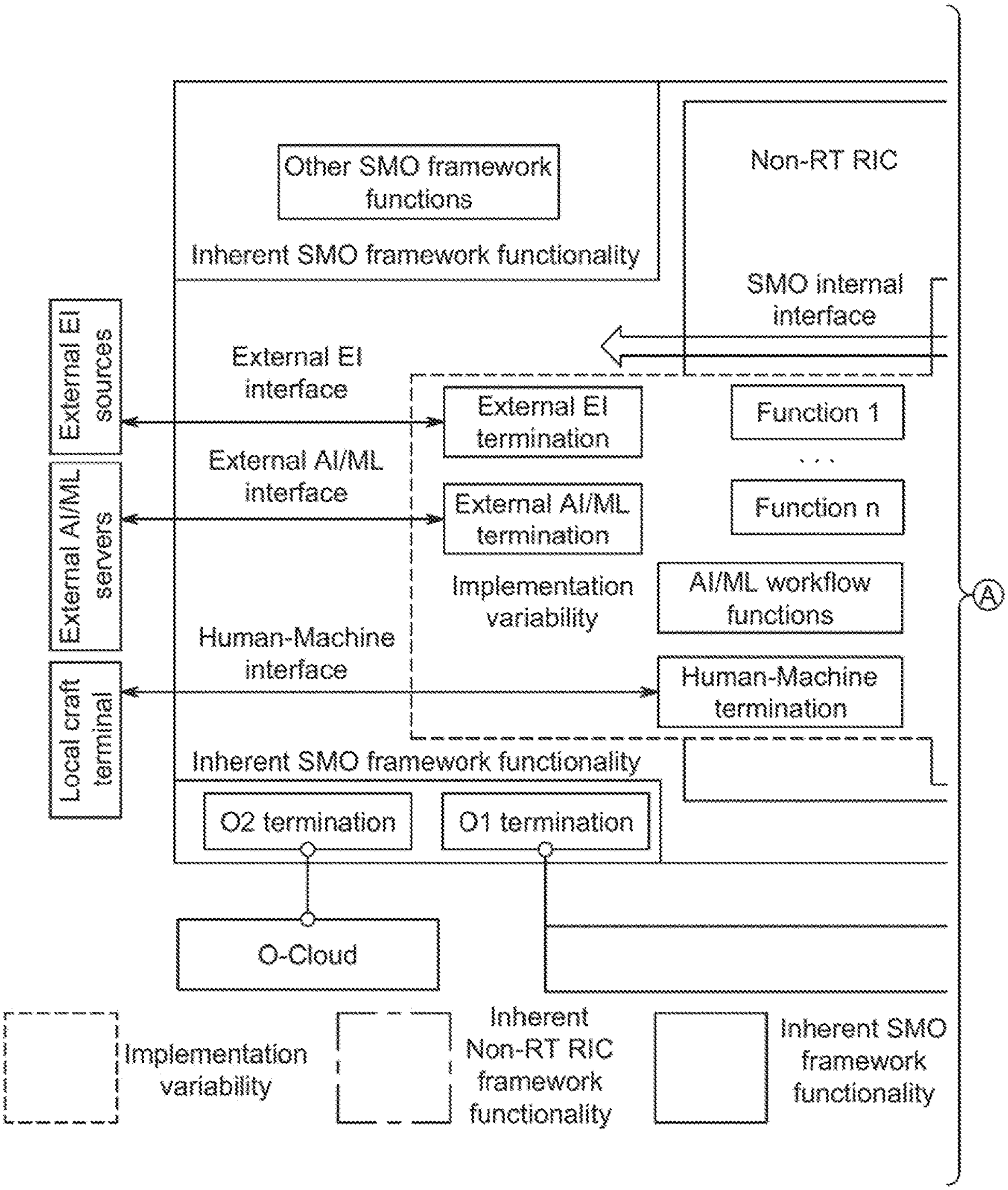
FIG. 2 is a diagram of a Service Management and Orchestration (SMO) framework with a non-real-time (NRT) RAN Intelligent Controller (RIC) architecture in a functional view according to related art.
Figure 2:
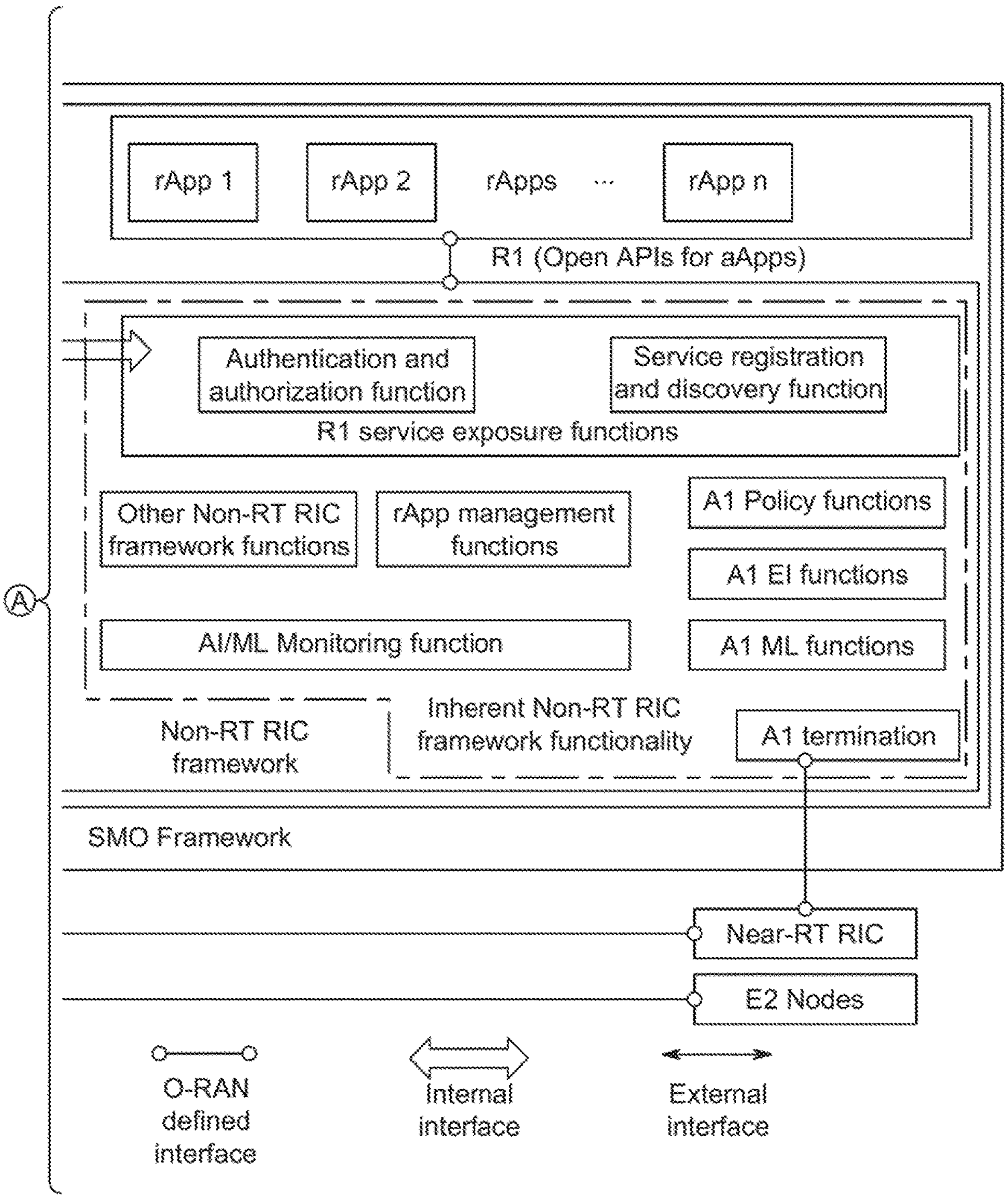
Figure 3:
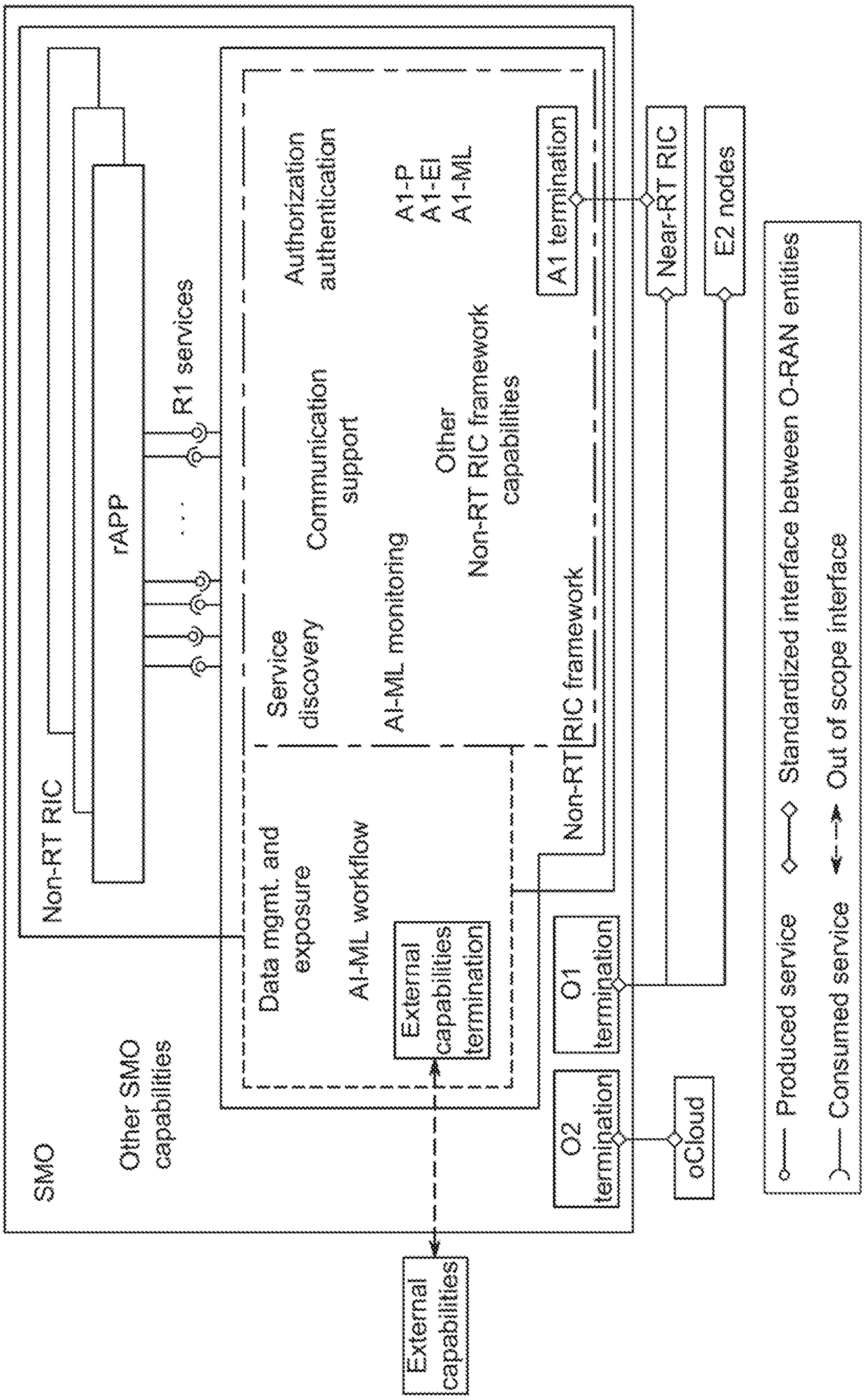
FIG. 3 is a diagram of a related art SMO framework with an NRT RIC in a services view according to related art.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments provide a system (as well as methods, devices, networks, etc.) for power and traffic management in an open radio access network (O-RAN). In particular, the system may monitor the O-RAN by obtaining parameters indicating traffic performance of O-RAN Cloud (O-Cloud) nodes. The parameters indicating traffic performance may include a central processing unit (CPU) usage of an O-Cloud node, a memory usage of an O-Cloud node, a disk throughput of an O-Cloud node, etc. The system may obtain the parameters from an O-Cloud server. Based on the obtained parameters, the system may determine whether at least one parameter of the parameters indicating traffic performance of an O-Cloud node satisfies a predetermined shutdown condition. The predetermined shutdown condition may include conditions based on a CPU usage of the O-Cloud node being below a CPU usage percentage threshold, a memory usage of the O-Cloud node being below a memory usage percentage threshold, a disk throughput of the O-Cloud node being below a disk throughput usage percentage threshold, and/or a combination of such shutdown conditions. Based on determining that at least one parameter of the parameters indicating traffic perform satisfies the predetermined shutdown condition, the system may deactivate the O-Cloud node.

The system may include a federated O-Cloud orchestration and management (FOCOM) controller of a service management and orchestration (SMO) framework, and the system may determine that at least one parameter satisfies the shutdown condition based on a predefined shutdown policy configured for the FOCOM controller. The system may alternatively or additionally include a non-real-time (NRT) RAN intelligent controller (RIC) for the SMO, and the NRT RIC may be configured to perform the operations described above.

Based on determining that at least one parameter satisfies the predetermined shutdown condition and prior to deactivating the O-Cloud node, the system may notify the O-Cloud node that O-Cloud node is determined to be deactivated. In such instances, the O-Cloud node may be deactivated after a predetermined grace period that starts about when the O-Cloud node is notified. Alternatively, the system may perform a non-graceful deactivation of the O-Cloud node, providing no notification that the O-Cloud node is determined to be deactivated. Furthermore, the system may terminate at least one application operating on the O-Cloud node prior to the O-Cloud node being deactivated. Furthermore, based on determining that at least one parameter satisfies the predetermined shutdown condition and prior to deactivating the O-Cloud node, the system may transfer a workload associated with the O-Cloud node to another O-Cloud node in the O-RAN.

Thus, by monitoring the O-RAN as is disclosed herein, power consumption may be reduced by deactivating O-Cloud nodes with limited or no use, and traffic may be better distributed throughout the O-RAN.

Figure 4A:
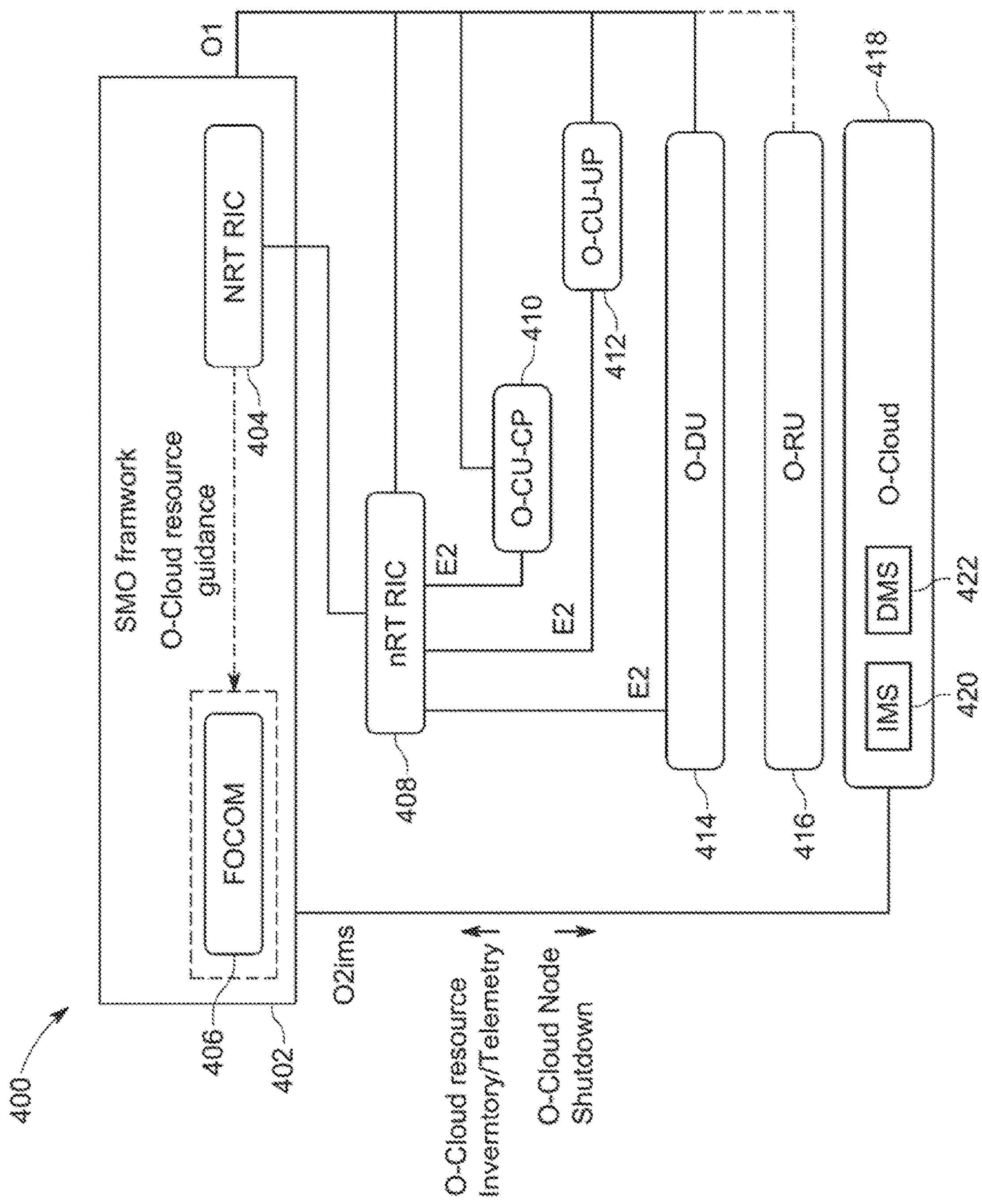
FIG. 4A is a diagram of an O-RAN architecture, according to an embodiment.

FIG. 4A is a diagram of an O-RAN architecture 400, according to an embodiment. The O-RAN architecture 400 may include SMO framework 402 including an NRT RIC 404 and a FOCOM controller 406. The O-RAN architecture 400 may include a near-real-time (nRT) RIC 408, an O-RAN Centralized Unit (O-CU) control plane (O-CU-CP) 410, an O-CU user plane (O-CU-UP) 412, an O-RAN Distributed Unit (O-DU) 414, an O-RAN Radio Unit (O-RU) 416, and an O-RAN Cloud (O-Cloud) server 418. The O-Cloud server 418 may include an infrastructure management service (IMS) module 420 and a deployment management services (DMS) module 422. As shown in FIG. 4A, the FOCOM controller 406 may be configured to obtain parameters indicating traffic performance of O-Cloud nodes from the O-Cloud server 418. That is, the NRT RIC 404 may be pushing a predefined shutdown policy to the FOCOM controller 406. One example of a predefined shutdown policy is shown in Table 1.

TABLE 1

```
# Shutdown Policy
{
"Scope": {
"oCloudID": "XXXXX"
"globalCloudID": "XXXXX"
},
"Objectives": {
"GracefulNodeShutdown" : Y
"CPU Usage": < 5% AND
"memory usage": < 10% AND
"disk throughput" : < 10%
"Tshutdown" : 60min
  }
}
```

As shown in Table 1, a shutdown policy may include an option for a graceful node shutdown. In a graceful node shutdown, a grace period may be provided between the time an O-Cloud node is determined to be deactivated and a time of deactivating the O-Cloud node. In the policy of Table 1, the graceful node shutdown option is active (i.e., "Y"). The shutdown policy in Table 1 may also include parameters indicating traffic performance, and the shutdown conditions associated with the parameters. For example, the shutdown policy may include a parameter of CPU usage, memory usage, and disk throughput, and the shutdown conditions may include the CPU usage being less than the CPU usage percentage threshold (set at 5%), the memory usage being less than the memory usage percentage threshold (set at 10%), and a disk throughput being less than the disk throughput percentage threshold (set at 10%). The various percentage thresholds may be set to different values to increase or decrease deactivations as will be understood by one of ordinary skill in the art from the disclosure herein. Additional shutdown parameters may be utilized, such as parameters based on a number of nodes in the O-RAN, node configurations, topology, node states, etc. Furthermore, although the policy in Table 1 requires all three shutdown conditions to be met to determine that an O-Cloud node should be deactivated, this is exemplary and not exclusive, as any number of shutdown conditions may be utilized to determine that an O-Cloud node should be deactivated. In the policy of Table 1, "Tshutdown" corresponds to an amount of time the O-Cloud node is to be shut down after the O-Cloud node is deactivated. Thus, the FOCOM controller 406 may obtain the parameters from the O-Cloud server 418, and then determine whether the parameters satisfy the shutdown conditions configured for the policy.

Figure 4B:
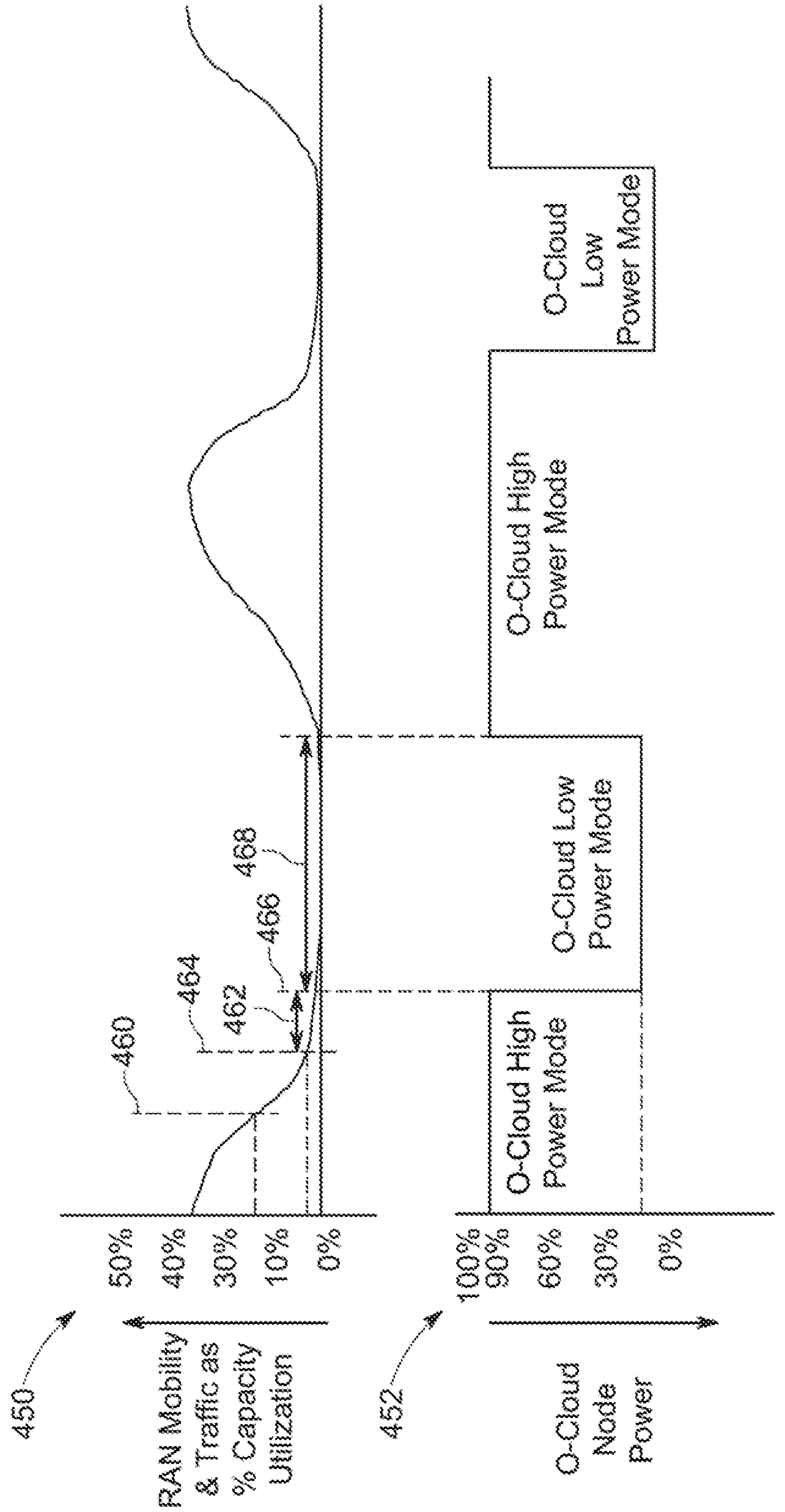
FIG. 4B is a diagram of graphs showing capacity utilization and O-RAN Cloud (O-Cloud) node power, according to an embodiment.

FIG. 4B is a diagram of graphs showing capacity utilization and O-Cloud node power, according to an embodiment. In particular, FIG. 4B depicts graph 450 of RAN mobility and traffic percentage capacity utilization over time and graph 452 of a percentage of O-Cloud node power over time. As shown in graph 450, based on the shutdown conditions of the policy of Table 1, at time point 460, the FOCOM controller 406 may determine that the O-Cloud node should be deactivated corresponding to about 20% of the percentage capacity utilization. The shutdown conditions of the policy may be configured to trigger a deactivation based on a desired percentage threshold of the percentage capacity utilization. As graph 450 depicts a graceful node shutdown, a grace period 462 may be initiated at time 464 after it is determined that the O-Cloud node is to be deactivated. Time 464 may occur at any time between the time it is determined to deactivate the O-Cloud node and the time of deactivation of the O-Cloud node. During the grace period 462, node draining may be performed. That is, the O-Cloud node may be notified of the scheduled O-Cloud node deactivation, and the O-Cloud node may transfer operations/applications to another O-Cloud node in the O-RAN and/or properly terminate operations/applications on the O-Cloud node (i.e., avoiding immediate and unexpected operation/application termination). In embodiments where a non-graceful termination is performed, a limited grace period or no grace period may be provided.

At time 466, at the conclusion of the grace period 462, the O-Cloud node may be deactivated. The O-Cloud node may be deactivated for a shutdown period 468. As shown by graph 452, the O-Cloud node may have two power modes, a high power mode and a low power mode. Notably, while the O-Cloud node is in the high power mode, the same or substantially the same amount of power is consumed, even though, as shown in graph 450, the percentage capacity utilization is greatly reduced. Thus, when the O-Cloud node is deactivated at time 466, the O-Cloud node may enter a low power mode for the predetermined shutdown time, conserving power.

Figure 4C:
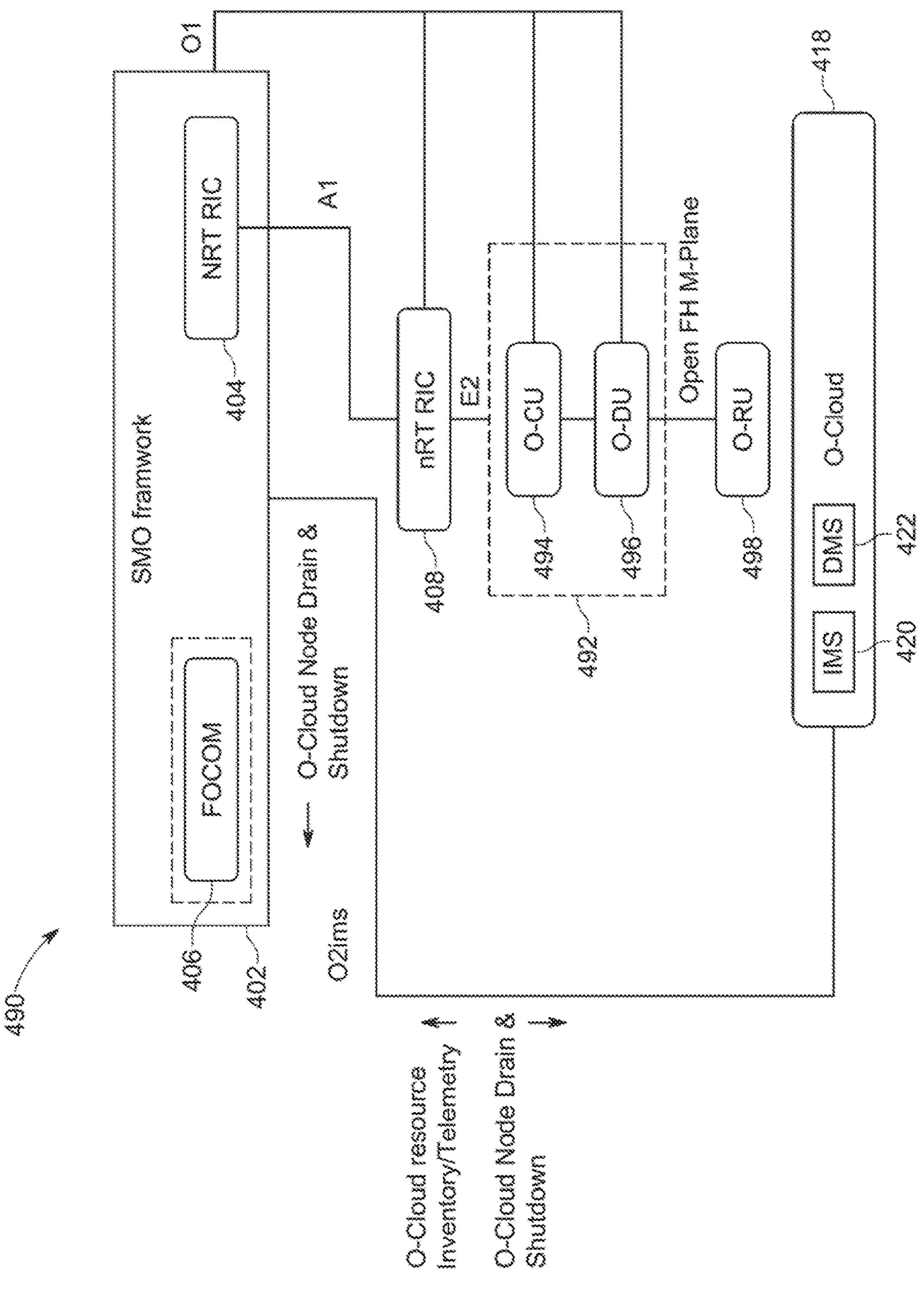
FIG. 4C is a diagram of an O-RAN architecture, according to an embodiment.

FIG. 4C is a diagram of an O-RAN architecture 490, according to an embodiment. The O-RAN architecture 490 is similar to the O-RAN architecture 400, except that the NRT RIC 404 is configured to push the node draining and shutdown actions. Furthermore, the O-RAN architecture 490 includes a fronthaul (FH) M-plane 492 including an O-CU 494 and an O-DU 496, as well as an O-RU 498 in connection with the FH M-plane 492. In such embodiments, the NRT RIC 404 may obtain the parameters indicating traffic performance of the O-Cloud nodes directly from the O-Cloud server 418, and may be configured to determine deactivations of O-Cloud nodes based on the parameters. The NRT RIC 404 may be configured to determine deactivations of O-Cloud nodes without implementing a policy such at the policy implemented with the FOCOM controller 406. The NRT RIC 404 may be configured to push the node draining and shutdown operations to the IMS module 420.

Figure 5:
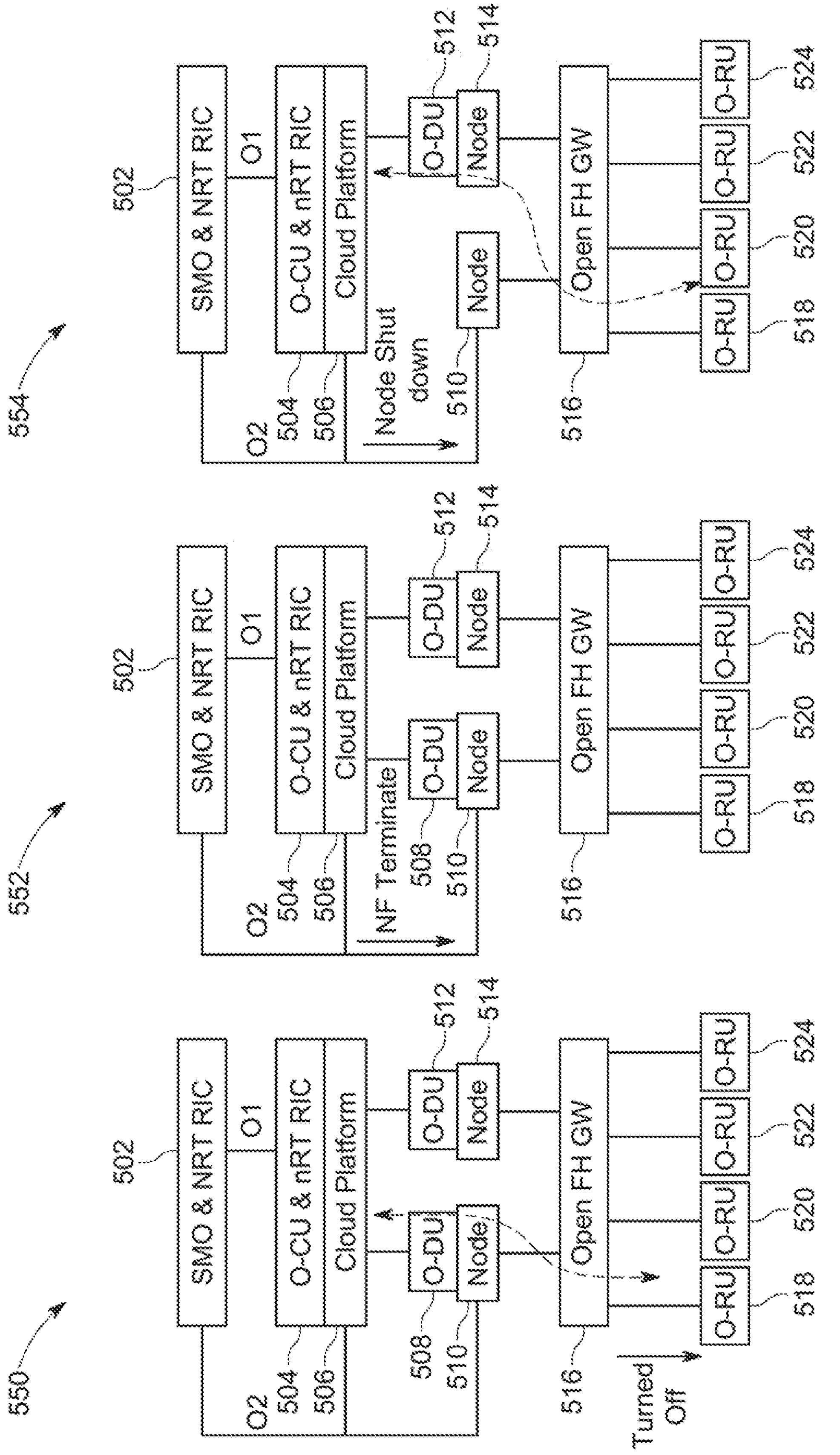
FIG. 5 is a diagram of a process of O-Cloud node deactivation in a single node scenario, according to an embodiment.

FIG. 5 is a diagram of a process of O-Cloud node deactivation in a single node scenario, according to an embodiment. The system in the single node scenario may include an SMO including an NRT RIC 502, an O-CU and nRT RIC 504, a cloud platform 506, a first O-DU 508 operating on a first O-Cloud node 510, a second O-DU 512 operating on a second O-Cloud node 514, an open fronthaul gateway (FH GW) 516, a first O-RU 518, a second O-RU 520, a third O-RU 522, and a fourth RU 524.

In operation 550, the NRT RIC 502, as well as the nRT RIC 504 in some embodiments, may analyze traffic patterns of the O-RUs 518-524 and then determine that the first O-RU 518 and the second O-RU 520 will have limited or no traffic. That is, the traffic occurring from the first O-RU 518 and the second O-RU 520 may be through the first O-DU 508 and the first O-Cloud node 510. The NRT RIC 502 may be configured to deactivate the first O-RU 518 and the second O-RU 520.

As shown in operation 552, after the first O-RU 518 and the second O-RU 520 are deactivated, the NRT RIC 502 may remove the first O-DU 508 from the first O-Cloud node 510 as part of the node draining procedure. In operation 554, the NRT RIC 502 may deactivate the first O-Cloud node 510 after the node draining procedure is completed. The first O-RU 518 and the second O-RU 520 may be mapped to the second O-Cloud node 514 after the first O-Cloud node 510 is deactivated. The remapping of the first O-RU 518 and the second O-RU 520 may be achieved through shared O-RUs and baseband unit (BBU) pooling.

Figure 6A:
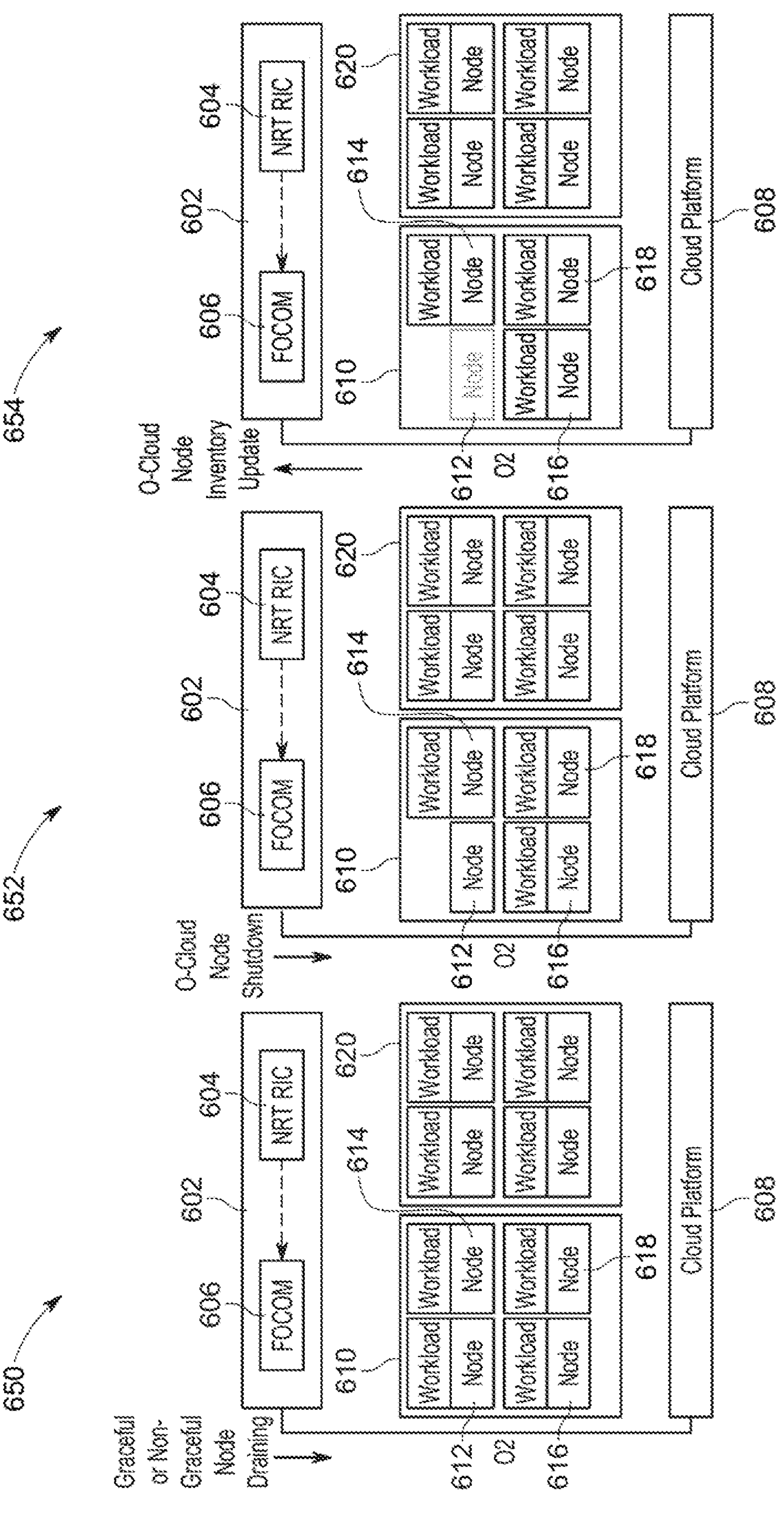
FIG. 6A a diagram of a process of O-Cloud node deactivation in a Kubernetes cluster node scenario, according to an embodiment.

FIG. 6A a diagram of a process of O-Cloud node deactivation in a Kubernetes cluster node scenario, according to an embodiment. The system in the Kubernetes cluster scenario may include an SMO 602 including a NRT RIC 604 and a FOCOM controller 606, a cloud platform 608, a first cluster 610 including a first O-Cloud node 612, a second O-Cloud node 614, a third O-Cloud node 616 and a fourth O-Cloud node 618, and a second cluster 620 including a plurality of nodes. Each of the nodes may include a corresponding workload (e.g., operations, applications, etc.).

In operation 650, the SMO 602 (either by the NRT-RIC 604 or the FOCOM controller 606) may determine that the first O-Cloud node 612 should be deactivated. In operation 652, the SMO 602 may either initiate the node draining procedure in a graceful termination procedure, or terminate the workload corresponding to the first O-Cloud node 612, such that the workload is removed from the first O-Cloud node 612. In operation 654, when the SMO 602 determines that the first O-Cloud node 612 is idle, the first O-Cloud node 612 may be deactivated. Once the deactivation is complete, the SMO 602 may receive inventory update information regarding the nodes and cluster formations (e.g., available nodes) for further operations.

Figure 6B:
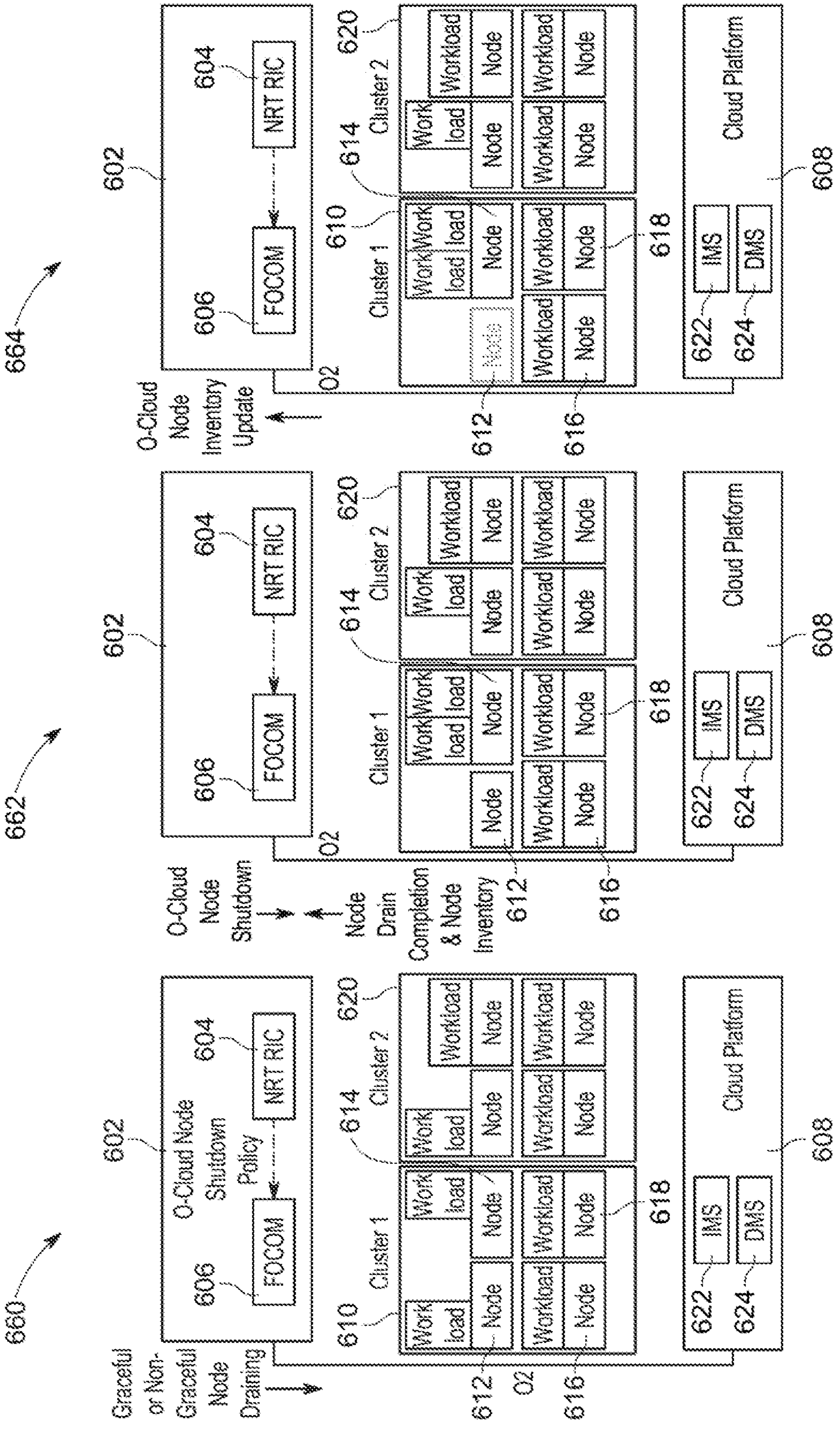
FIG. 6B a diagram of a process of O-Cloud node deactivation in a Kubernetes cluster node scenario, according to an embodiment.

FIG. 6B a diagram of a process of O-Cloud node deactivation in a Kubernetes cluster node scenario, according to an embodiment. The system in FIG. 6B is similar to the system in FIG. 6A, however the cloud platform 610 may include an IMS module 622 and a DMS module 624. As shown in operation 660, the first O-Cloud node 612 includes a partial workload that does not consume all processing power of the first O-Cloud node 612, and the second O-Cloud node 614 includes a partial workload that does not consume all processing power of the second O-Cloud node 614. As shown in operation 662, as part of the node draining procedure, the partial workload of the first O-Cloud node 612 may be transferred/relocated to the available space on the second O-Cloud node 614 that is available on the second O-Cloud node 614 due to the partial workload. The IMS module 622 may be configured to transfer/relocate the workloads based on internal criteria such as available space, etc. As shown in operation 664, after the workload is transferred and the first O-Cloud node 612 is idle, the SMO 602 may deactivate the first O-Cloud node 612.

Figure 7A:
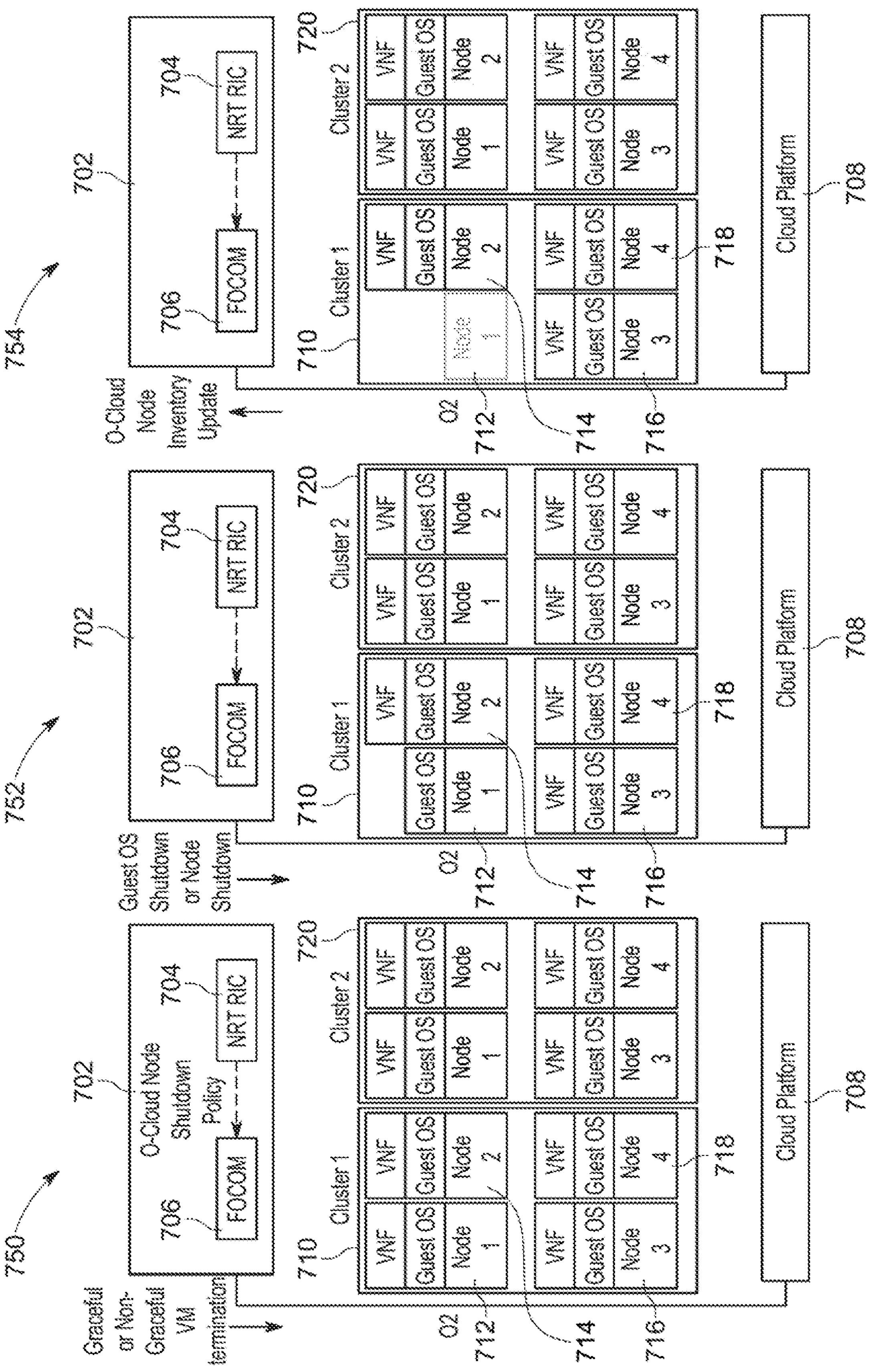
FIG. 7A a diagram of a process of O-Cloud node deactivation in a virtual machine (VM) node scenario, according to an embodiment.

FIG. 7A a diagram of a process of O-Cloud node deactivation in a virtual machine (VM) node scenario, according to an embodiment. The system in the VM node scenario may include an SMO 702 including a NRT RIC 704 and a FOCOM controller 706, a cloud platform 708, a first cluster 710 including a first O-Cloud node 712, a second O-Cloud node 714, a third O-Cloud node 716 and a fourth O-Cloud node 718, and a second cluster 720 including a plurality of nodes. Each of the nodes may include a corresponding virtual network function (VNF) operating on the nodes via a guest operating system (OS).

In operation 750, the SMO 702 (either by the NRT-RIC 704 or the FOCOM controller 706) may determine that the first O-Cloud node 712 should be deactivated. In operation 752, the SMO 702 may either initiate the node draining procedure in a graceful termination procedure, or terminate the VNF corresponding to the first O-Cloud node 712, such that the VNF corresponding to the first O-Cloud node 712 is terminated. After the VNF corresponding to the first O-Cloud node 712 is terminated, the SMO 702 may initiate the shutdown of the guest OS corresponding to the first O-Cloud node 712. In operation 754, when the SMO 702 determines that the first O-Cloud node 712 is idle and that the guest OS is shutdown, the first O-Cloud node 712 may be deactivated. Once the deactivation is complete, the SMO 702 may receive inventory update information regarding the nodes and cluster formations (e.g., available nodes) for further operations.

Figure 7B:
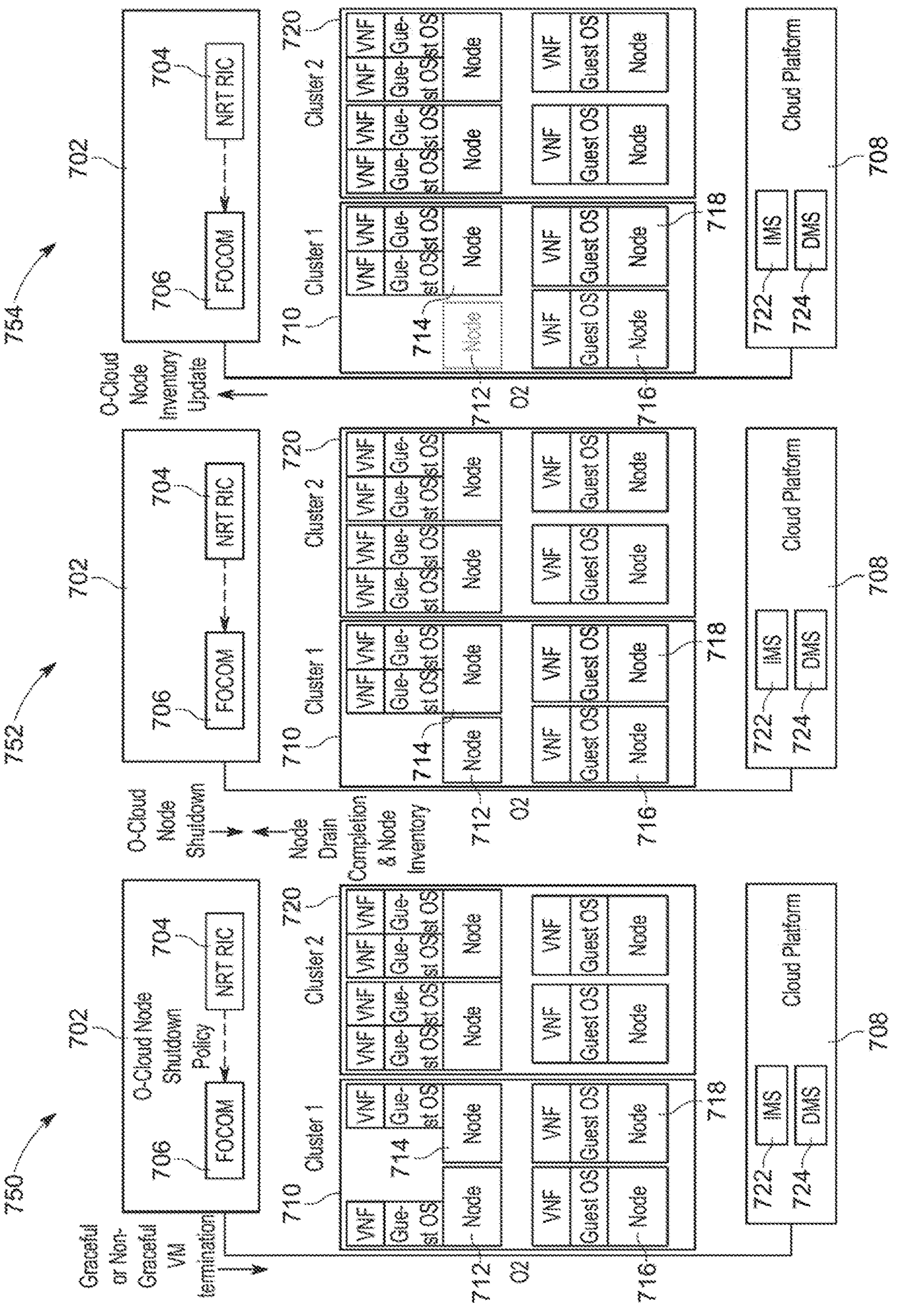
FIG. 7B a diagram of a process of O-Cloud node deactivation in a VM node scenario, according to an embodiment.

FIG. 7B a diagram of a process of O-Cloud node deactivation in a VM node scenario, according to an embodiment. The system in FIG. 7B is similar to the system in FIG. 7A, however the cloud platform 710 may include an IMS module 722 and a DMS module 724. As shown in operation 760, the first O-Cloud node 712 includes a VNF and a guest OS that utilizes a portion of the processing power of the first O-Cloud node 712, and the second O-Cloud node 714 includes a VNF and a guest OS that utilizes a portion of the processing power of the second O-Cloud node 714. As shown in operation 762, as part of the node draining procedure, the VNF and guest OS of the first O-Cloud node 712 may be transferred/relocated to the available space on the second O-Cloud node 714 that is available on the second O-Cloud node 714. The IMS module 722 may be configured to transfer/relocate the VNFs and the guest OS based on internal criteria such as available space, etc. As shown in operation 764, after the VNF and guest OS is transferred and the first O-Cloud node 712 is idle, the SMO 702 may deactivate the first O-Cloud node 712.

Figure 8:
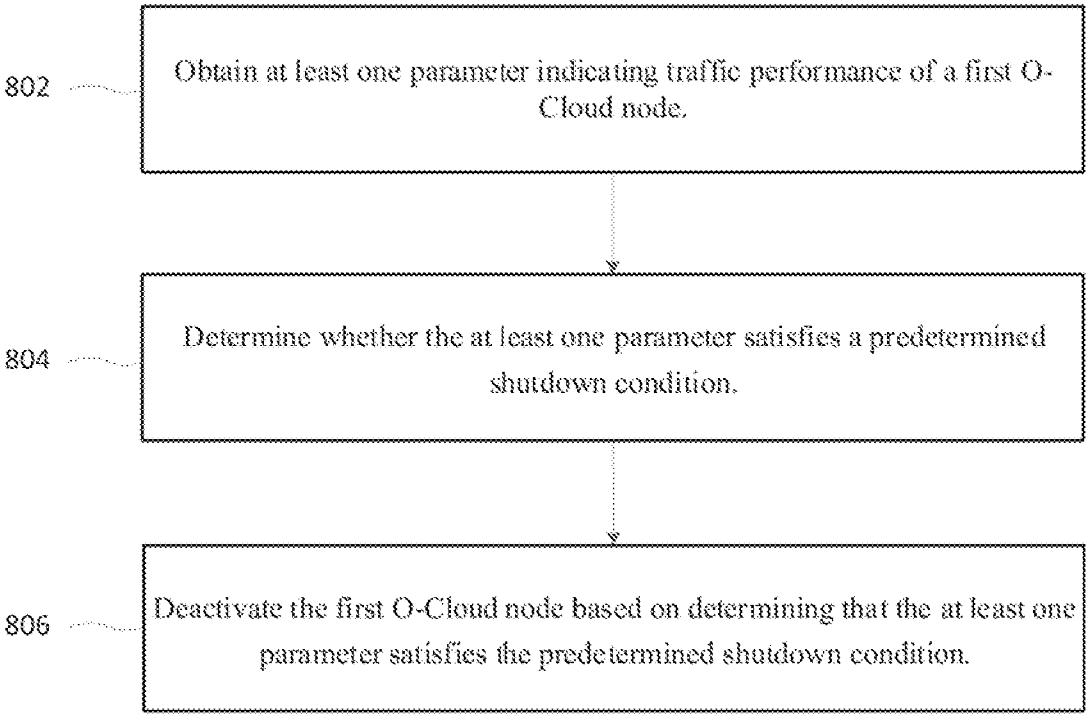
FIG. 8 is a flowchart of a method for power and traffic management in an O-RAN, according to an embodiment.

FIG. 8 is a flowchart of a method for power and traffic management in an O-RAN, according to an embodiment. In operation 802, the system may obtain at least one parameter indicating traffic performance of a first O-Cloud node. In operation 804, the system may determine whether the at least one parameter satisfies a predetermined shutdown condition for the first O-Cloud node. In operation 806, the system may deactivate the first O-Cloud node based on determining that the at least one parameter satisfies the predetermined shutdown condition.

Figure 9:
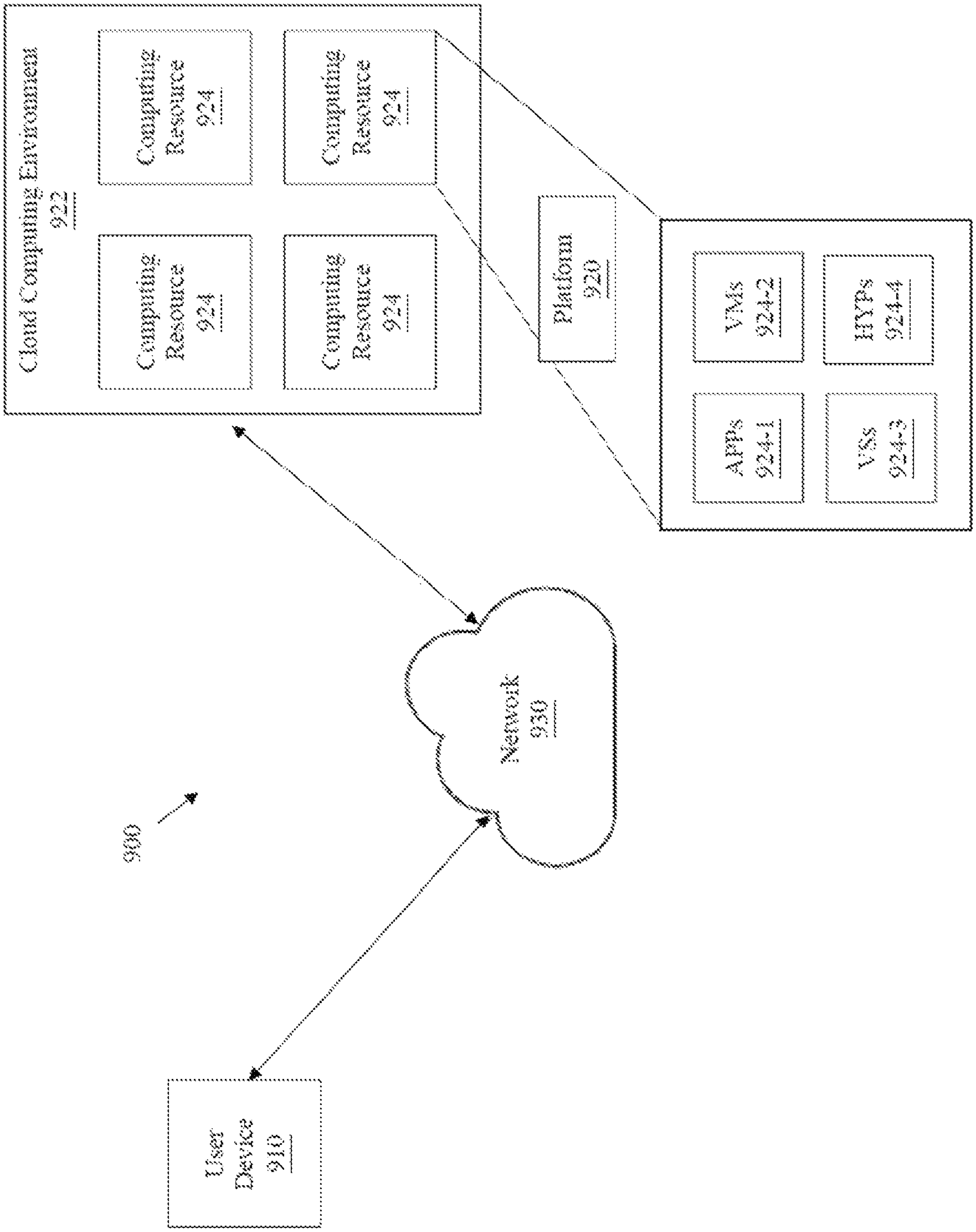
FIG. 9 is a diagram of an example environment in which systems and/or methods, described herein, may be implemented, according to an embodiment.

FIG. 9 is a diagram of an example environment 900 in which systems and/or methods, described herein, may be implemented. As shown in FIG. 9, environment 900 may include a user device 910, a platform 920, and a network 930. Devices of environment 900 may interconnect via wired connections, wireless connections, or a combination of wired and wireless connections. In embodiments, any of the functions and operations described with reference to FIG. 9 above may be performed by any combination of elements illustrated in FIG. 9.

User device 910 includes one or more devices capable of receiving, generating, storing, processing, and/or providing information associated with platform 920. For example, user device 910 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 910 may receive information from and/or transmit information to platform 920.

Platform 920 includes one or more devices capable of receiving, generating, storing, processing, and/or providing information. In some implementations, platform 920 may include a cloud server or a group of cloud servers. In some implementations, platform 920 may be designed to be modular such that certain software components may be swapped in or out depending on a particular need. As such, platform 920 may be easily and/or quickly reconfigured for different uses.

In some implementations, as shown, platform 920 may be hosted in cloud computing environment 922. Notably, while implementations described herein describe platform 920 as being hosted in cloud computing environment 922, in some implementations, platform 920 may not be cloud-based (i.e., may be implemented outside of a cloud computing environment) or may be partially cloud-based.

Cloud computing environment 922 includes an environment that hosts platform 920. Cloud computing environment 922 may provide computation, software, data access, storage, etc. services that do not require end-user (e.g., user device 910) knowledge of a physical location and configuration of system(s) and/or device(s) that hosts platform 920. As shown, cloud computing environment 922 may include a group of computing resources 924 (referred to collectively as "computing resources 924" and individually as "computing resource 924").

Computing resource 924 includes one or more personal computers, a cluster of computing devices, workstation computers, server devices, or other types of computation and/or communication devices. In some implementations, computing resource 924 may host platform 920. The cloud resources may include compute instances executing in computing resource 924, storage devices provided in computing resource 924, data transfer devices provided by computing resource 924, etc. In some implementations, computing resource 924 may communicate with other computing resources 924 via wired connections, wireless connections, or a combination of wired and wireless connections.

As further shown in FIG. 9, computing resource 924 includes a group of cloud resources, such as one or more applications ("APPs") 924-1, one or more virtual machines ("VMs") 924-2, virtualized storage ("VSs") 924-3, one or more hypervisors ("HYPs") 924-4, or the like.

Application 924-1 includes one or more software applications that may be provided to or accessed by user device 910. Application 924-1 may eliminate a need to install and execute the software applications on user device 910. For example, application 924-1 may include software associated with platform 920 and/or any other software capable of being provided via cloud computing environment 922. In some implementations, one application 924-1 may send/receive information to/from one or more other applications 924-1, via virtual machine 924-2.

Virtual machine 924-2 includes a software implementation of a machine (e.g., a computer) that executes programs like a physical machine. Virtual machine 924-2 may be either a system virtual machine or a process virtual machine, depending upon use and degree of correspondence to any real machine by virtual machine 924-2. A system virtual machine may provide a complete system platform that supports execution of a complete operating system ("OS"). A process virtual machine may execute a single program, and may support a single process. In some implementations, virtual machine 924-2 may execute on behalf of a user (e.g., user device 910), and may manage infrastructure of cloud computing environment 922, such as data management, synchronization, or long-duration data transfers.

Virtualized storage 924-3 includes one or more storage systems and/or one or more devices that use virtualization techniques within the storage systems or devices of computing resource 924. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 924-4 may provide hardware virtualization techniques that allow multiple operating systems (e.g., "guest operating systems") to execute concurrently on a host computer, such as computing resource 924. Hypervisor 924-4 may present a virtual operating platform to the guest operating systems, and may manage the execution of the guest operating systems. Multiple instances of a variety of operating systems may share virtualized hardware resources.

Network 930 includes one or more wired and/or wireless networks. For example, network 930 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks The number and arrangement of devices and networks shown in FIG. 9 are provided as an example. In practice, there may be additional devices and/or networks, fewer devices and/or networks, different devices and/or networks, or differently arranged devices and/or networks than those shown in FIG. 9. Furthermore, two or more devices shown in FIG. 9 may be implemented within a single device, or a single device shown in FIG. 9 may be implemented as multiple, distributed devices. Additionally, or alternatively, a set of devices (e.g., one or more devices) of environment 900 may perform one or more functions described as being performed by another set of devices of environment 900.

Figure 10:
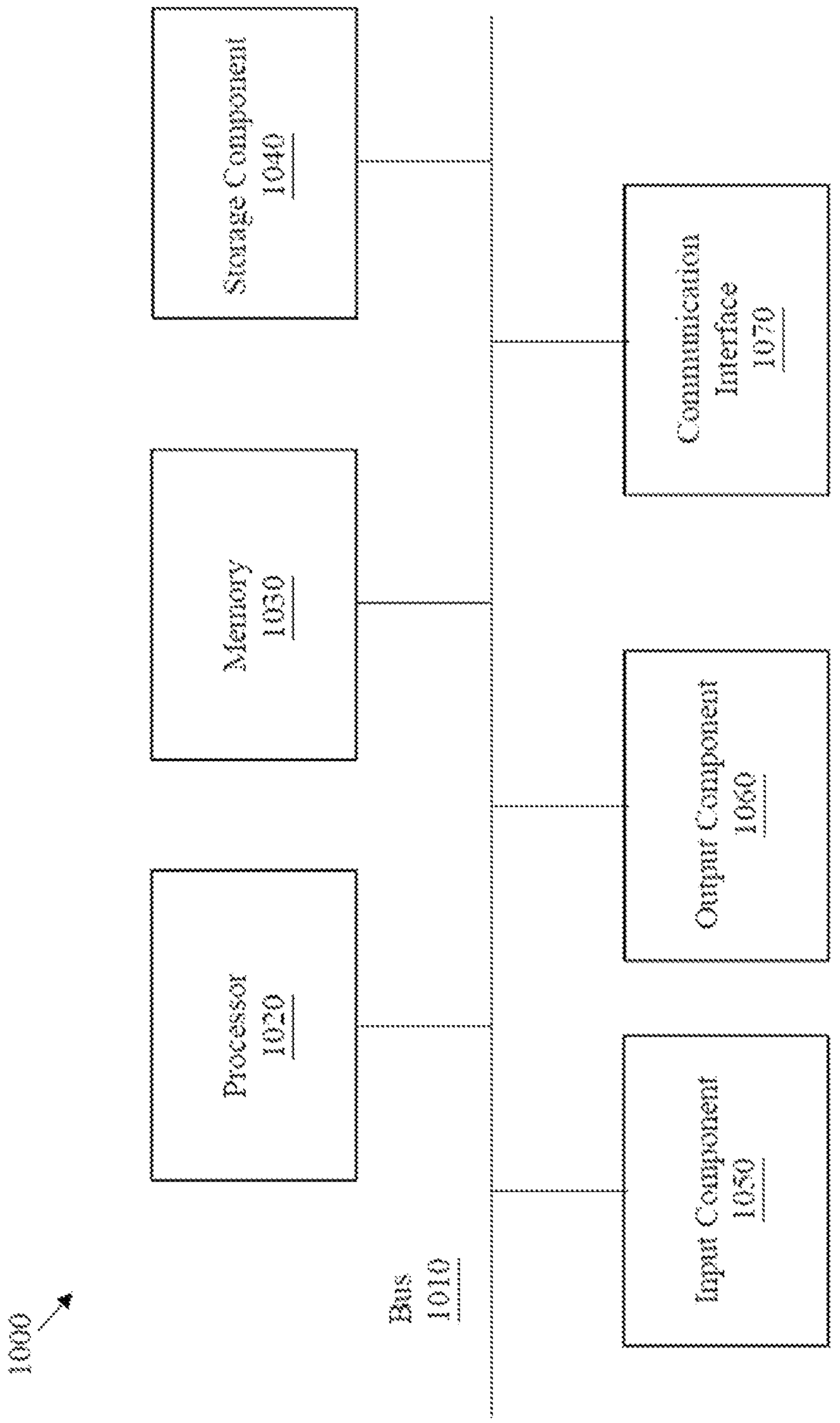
FIG. 10 is a diagram of example components of a device according to an embodiment.

FIG. 10 is a diagram of example components of a device 1000. Device 1000 may correspond to user device 910 and/or platform 920. As shown in FIG. 10, device 1000 may include a bus 1010, a processor 1020, a memory 1030, a storage component 1040, an input component 1050, an output component 1060, and a communication interface 1070.

Bus 1010 includes a component that permits communication among the components of device 1000. Processor 1020 may be implemented in hardware, firmware, or a combination of hardware and software. Processor 1020 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1020 includes one or more processors capable of being programmed to perform a function. Memory 1030 includes a random access memory (RAM), a read only memory (ROM), and/or another type of dynamic or static storage device (e.g., a flash memory, a magnetic memory, and/or an optical memory) that stores information and/or instructions for use by processor 1020.

Storage component 1040 stores information and/or software related to the operation and use of device 1000. For example, storage component 1040 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 1050 includes a component that permits device 1000 to receive information, such as via user input (e.g., a touch screen display, a keyboard, a keypad, a mouse, a button, a switch, and/or a microphone). Additionally, or alternatively, input component 1050 may include a sensor for sensing information (e.g., a global positioning system (GPS) component, an accelerometer, a gyroscope, and/or an actuator). Output component 1060 includes a component that provides output information from device 1000 (e.g., a display, a speaker, and/or one or more light-emitting diodes (LEDs)).

Communication interface 1070 includes a transceiver-like component (e.g., a transceiver and/or a separate receiver and transmitter) that enables device 1000 to communicate with other devices, such as via a wired connection, a wireless connection, or a combination of wired and wireless connections. Communication interface 1070 may permit device 1000 to receive information from another device and/or provide information to another device. For example, communication interface 1070 may include an Ethernet interface, an optical interface, a coaxial interface, an infrared interface, a radio frequency (RF) interface, a universal serial bus (USB) interface, a Wi-Fi interface, a cellular network interface, or the like.

Device 1000 may perform one or more processes described herein. Device 1000 may perform these processes in response to processor 1020 executing software instructions stored by a non-transitory computer-readable medium, such as memory 1030 and/or storage component 1040. A computer-readable medium is defined herein as a non-transitory memory device. A memory device includes memory space within a single physical storage device or memory space spread across multiple physical storage devices.

Software instructions may be read into memory 1030 and/or storage component 1040 from another computer-readable medium or from another device via communication interface 1070. When executed, software instructions stored in memory 1030 and/or storage component 1040 may cause processor 1020 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 10 are provided as an example. In practice, device 1000 may include additional components, fewer components, different components, or differently arranged components than those shown in FIG. 10. Additionally, or alternatively, a set of components (e.g., one or more components) of device 1000 may perform one or more functions described as being performed by another set of components of device 1000.

In embodiments, any one of the operations or processes of FIGS. 4-5 may be implemented by or using any one of the elements illustrated in FIGS. 6 and 7. It is understood that other embodiments are not limited thereto, and may be implemented in a variety of different architectures (e.g., bare metal architecture, any cloud-based architecture or deployment architecture such as Kubernetes, Docker, OpenStack, etc.).

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function (s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

What is claimed is:

1. A method of power and traffic management in an open radio access network (O-RAN), comprising:

obtaining at least one parameter indicating traffic performance of a first O-RAN Cloud (O-Cloud) node;

determining whether the at least one parameter satisfies a predetermined shutdown condition for the first O-Cloud node; and based on determining that the at least one parameter satisfies the predetermined shutdown condition, deactivating the first O-Cloud node, wherein the at least one parameter is obtained from an Infrastructure Management Service (IMS) of the O-RAN via an O2 interface, and wherein the deactivating the first O-Cloud node is instructed to the IMS via the O2 interface.

2. The method of claim 1, wherein the method is performed by a federated O-Cloud orchestration and management (FOCOM) function of a service management and orchestration (SMO) framework, and wherein determining whether the at least one parameter satisfies the predetermined shutdown condition is performed based on a predefined shutdown policy configured for the FOCOM function by, and received by the FOCOM function from, a non-real-time (NRT) RAN intelligent controller (RIC).

3. The method of claim 1, wherein the method is performed by a non-real-time (NRT) RAN intelligent controller (RIC) of a service management and orchestration (SMO) framework.

4. The method of claim 1, further comprising, based on determining that the at least one parameter satisfies the predetermined shutdown condition and prior to deactivating the first O-Cloud node, notifying the first O-Cloud node that the first O-Cloud node is determined to be deactivated.

5. The method of claim 4, wherein deactivating the first O-Cloud node is performed after a predetermined grace period, and wherein the predetermined grace period is a period of time that starts when the first O-Cloud node is notified that the first O-Cloud node is determined to be deactivated.

6. The method of claim 1, further comprising, based on determining that the at least one parameter satisfies the predetermined shutdown condition and prior to deactivating the first O-Cloud node, terminating at least one application operating on the first O-Cloud node.

7. The method of claim 6, further comprising, after terminating the at least one application and prior to deactivating the first O-Cloud node, terminating at least one virtual machine (VM) guest operating system (OS) associated with the first O-Cloud node.

8. The method of claim 1, further comprising, based on determining that the at least one parameter satisfies the predetermined shutdown condition and prior to deactivating the first O-Cloud node, transferring a workload associated with the first O-Cloud node to a second O-Cloud node.

9. The method of claim 1, wherein the at least one parameter comprises at least one of a central processing unit (CPU) usage of the first O-Cloud node, a memory usage of the first O-Cloud node, and a disk throughput of the first O-Cloud node.

10. The method of claim 1, wherein the at least one parameter is a hardware resource statistic of the O-Cloud node that hosts at least one E2 node.

11. The method of claim 1, wherein determining whether the at least one parameter satisfies the predetermined shutdown condition is performed based on a predefined shutdown policy comprising a parameter indicating whether the deactivating is to be a graceful shutdown in which any workloads on the first O-Cloud node are terminated, or a non-graceful shutdown in which the workloads are transferred to one or more other node before deactivating the first O-Cloud node.

12. A system of power and traffic management in an open radio access network (O-RAN), comprising:

at least one memory storing instructions; and at least one processor configured to execute the instructions to:

obtain at least one parameter indicating traffic performance of a first O-RAN Cloud (O-Cloud) node;

determine whether the at least one parameter satisfies a predetermined shutdown condition for the first O-Cloud node; and based on determining that the at least one parameter satisfies the predetermined shutdown condition, deactivate the first O-Cloud node, wherein the at least one parameter is obtained from an Infrastructure Management Service of the O-RAN via an O2 interface, and wherein the deactivating the first O-Cloud node is instructed to the IMS via the O2 interface.

13. The system of claim 12, wherein the at least one processor comprises a federated O-Cloud orchestration and management (FOCOM) function of a service management and orchestration (SMO) framework, and wherein the at least one processor is configured to execute the instructions to determine whether the at least one parameter satisfies the predetermined shutdown condition based on a predefined shutdown policy configured for the FOCOM function by, and received by the FOCOM function from, a non-real-time (NRT) RAN intelligent controller (RIC).

14. The system of claim 12, wherein the at least one processor comprises a non-real-time (NRT) RAN intelligent controller (RIC) of a service management and orchestration (SMO) framework.

15. The system of claim 12, wherein the at least one processor is further configured to execute the instructions to, based on determining that the at least one parameter satisfies the predetermined shutdown condition and prior to deactivating the first O-Cloud node, notify the first O-Cloud node that the first O-Cloud node is determined to be deactivated.

16. The system of claim 15, wherein the deactivating the first O-Cloud node is performed after a predetermined grace period, and wherein the predetermined grace period is a period of time that starts when the first O-Cloud node is notified that the first O-Cloud node is determined to be deactivated.

17. The system of claim 12, wherein the at least one processor is further configured to execute the instructions to, based on determining that the at least one parameter satisfies the predetermined shutdown condition and prior to deactivating the first O-Cloud node, terminate at least one application operating on the first O-Cloud node.

18. The system of claim 17, wherein the at least one processor is further configured to execute the instructions to, after terminating the at least one application and prior to deactivating the first O-Cloud node, terminate at least one virtual machine (VM) guest operating system (OS) associated with the first O-Cloud node.

19. The system of claim 12, wherein the at least one processor is further configured to execute the instructions to, based on determining that the at least one parameter satisfies the predetermined shutdown condition and prior to deactivating the first O-Cloud node, transfer a workload associated with the first O-Cloud node to a second O-Cloud node.

20. A non-transitory computer-readable storage medium storing instructions that, when executed by at least one processor, cause the at least one processor to:

obtain at least one parameter indicating traffic performance of a first open radio access network (O-RAN) Cloud (O-Cloud) node;

determine whether the at least one parameter satisfies a predetermined shutdown condition for the first O-Cloud node; and based on determining that the at least one parameter satisfies the predetermined shutdown condition, deactivate the first O-Cloud node, wherein the at least one parameter is obtained from an Infrastructure Management Service of the O-RAN via an O2 interface, and wherein the deactivating the first O-Cloud node is instructed to the IMS via the O2 interface.

* * * * *